United States Patent [19]
Parent et al.

[11] Patent Number: 6,056,801
[45] Date of Patent: *May 2, 2000

[54] PEAT BASED COMPOSITIONS

[76] Inventors: Leon-Etienne Parent, 4480-L, Rue des Bosquets, St.-Augustin de Desmaures, Quebec, Canada, G3A 1C2; Alexandre Mailloux, 1428 Labrie, Longueuil, Quebec, Canada, J4G 2K1; Bruno Breton, 8521 des Harfangs, Levis, Quebec, Canada, G6V 8S9

[ * ] Notice: This patent is subject to a terminal disclaimer.

[21] Appl. No.: 09/009,014

[22] Filed: Jan. 16, 1998

Related U.S. Application Data

[63] Continuation-in-part of application No. 08/645,990, May 14, 1996, Pat. No. 5,749,934.
[51] Int. Cl.$^7$ .............................. C05F 11/02; C05C 9/00; C05B 7/00
[52] U.S. Cl. ........................... 71/24; 71/28; 71/34; 71/51
[58] Field of Search .................................. 71/24, 28, 34, 71/51

[56] References Cited

U.S. PATENT DOCUMENTS

| | | |
|---|---|---|
| 3,307,934 | 3/1967 | Palmer . |
| 3,617,237 | 11/1971 | Nagasawa . |
| 5,749,934 | 5/1998 | Parent et al. ................................ 71/24 |

FOREIGN PATENT DOCUMENTS

| | | |
|---|---|---|
| 2076598 | 2/1994 | Canada . |

OTHER PUBLICATIONS

Canadian Journal of Soil Science 73(2):197–208, 1993, "Nitrogen availability and nitrate leaching from organo-mineral fertilizers".
Fertilizer Research 36:249–257, 1993, "Ammonia sorption by peat and N fractionation in some peat-amonia systems".
Memoire de maitrise, Universite Laval, 1993, Ferilisation de la pomme de terr (*Solanum tuberosum* L.) a l'aide d'un engrais organo-mineral a base de tourbe ammoniacee.
Soil Biology and Biochemistry 26(8): 1041–1051, "Nitrification of ammoniated peat and ammonium sulfate in mineral soils".
Soil Boil, Biochem, vol. 26, No. 8 pp. 1041–1051, 1994, "Nitrification of ammoniated peat and ammonium sulfate in mineral soils".
Canadian Journal of Soil Science 75:261–272, 1995, "Onion response to ammoniated peat and ammonium sulfate in relation to ammonium toxicity".
Cambouris, Athyna, 1994, "Etude de l-efficacite de la fertilisation organo-minerale a base de tourbe ammoniacee dans la culture de la pomme de terre sous les conditions de l'est de Quebec".
Canadian Journal of Soil Science 75:273–280, 1995, "N uptake and recovery by onions from peat-mineral fertilizers".
4th International peat Congress. Jun. 25–30 Otainen (Finland). Peat Chemistry & Physics 5:227–234, 1972, "Granulated organomineral fertilizers in sapropel and peat stuff basis".
Entente Canada—Nouveau–Brunswick sur l'exploitation miniere 1987 Fredericton, N.B., 1987, "Survey of the uses of peat in agriculture".

*Primary Examiner*—Steven P. Griffin
*Assistant Examiner*—Maribel Medina
*Attorney, Agent, or Firm*—Fay, Sharpe, Fagan, Minnich & McKee, LLP

[57] ABSTRACT

A composition of matter is provided which comprises a peat material and an added source of nitrogen, said added source of nitrogen consisting of one of urea, diammonium phosphate, monoammonium phosphate and ammonia. A composition such as this may be used in a process for making a peat fertilizer in the form of granulars.

28 Claims, 1 Drawing Sheet

PEAT BASED COMPOSITIONS

The present application is a continuation-in-part from U.S. application Ser. No. 08/645,990 filed May 14, 1996, entitled "Peat Based Compositions", now U.S. Pat. No. 5,749,934.

BACKGROUND OF THE INVENTION

1. Field of the Invention

The present invention relates to fertilizers based on peat.

2. Description of the Related Art

Components based on peat are known. The known practice for preparing a peat is to add, to a peat, two or more separate sources of a plant growth or nutrition factor such as, for example, nitrogen, phosphorous and potassium. U.S. Pat. No. 3,307,934 for example indicates that it is known to prepare a peat based granular or aggregate fertilizer by combining peat with added sources of nitrogen, phosphorous and potassium (i.e. N, P and K); see example 1 and 4 of this patent where it is respectively indicated that peat may be associated with urea and diammonium phosphate or urea and ammonia.

It would be advantageous to be able to have an effective peat composition comprising a single added source of nitrogen or a single added source of nitrogen and phosphorous, e.g. to reduce the cost of the starting materials needed to produce an effective peat fertilizer composition and to reduce the labour costs as well (i.e. less manipulation of the starting materials. It would be advantageous to have a means for obtaining a peat fertilizer composition based on a single added source of a plant growth factor. It would in particular be advantageous to have such a fertilizer composition for use in the growth of potatoes, corn, wheat or other crop.

Accordingly, the present invention provides a composition of matter comprising a peat material and an added source of nitrogen, said added source of nitrogen consisting of one of urea, diammonium phosphate, monoammonium phosphate and ammonia. The peat material may be an acidic, humic peat material. The peat material may advantageously be an acid peat of medium to high decomposition, i.e. of relatively high humic acid content.

It is to be understood herein that the expression—added source of nitrogen—refers to a source of nitrogen that is added to or admixed with the peat for the formation of the composition of matter. The added source of nitrogen is either urea, or diammonium phosphate or one of the other above mentioned nitrogen sources.

The added source of nitrogen may be added in any suitable or known manner or form. The added nitrogen source may be added for example as a solid (e.g. particles; as a paste (e.g. with water); as a solution (e.g. an aqueous solution of ammonia and water); if the case permits, as a gas (e.g. ammonia); etc.

The composition may have a nitrogen content, for example, of from 6% to 37% by weight. The peat content of the composition of matter may vary from 20% to 80% by weight.

This composition of matter may take on any desired or necessary form including, for example, a mixture to be used as a pre-cursor or intermediate substance for the preparation of a peat fertilizer in the form of a granule or the like; it includes granules.

In a further aspect the present invention provides in a process for making a peat fertilizer composition comprising a mixing stage wherein a peat material and an added source of nitrogen are mixed so as to form a mixture thereof, the improvement wherein said added source of nitrogen consists of one of urea, diammonium phosphate, monoammonium phosphate and ammonia. As mentioned above, the peat material may advantageously be an acid peat of medium to high decomposition, i.e. of relatively high humic acid content. The mixture may take the form of a pre-cursor or intermediate mixture which may be sent on to an extrusion stage wherein the mixture of peat and the added source of nitrogen are extruded so as to form an extrudate thereof. The extrudate may then be dried and as desired or necessary the dried product may be subjected to a size reduction stage to obtain granules of a desired size or size range.

The peat prior to being intermingled with the added nitrogen source may initially have a water content of from about 25 to 60 percent (e.g. 55 to 60 percent, e.g. 30 percent by weight, e.g. 40 percent by weight).

Once the peat is associated with the so added source of nitrogen, the initial source of nitrogen may subsequently be subjected to an in situ conversion process whereby, if the added source of nitrogen acts effectively as a $NH_3$ carrier, $NH_3$ may be formed in situ, e.g. slowly, due to hydrolysis of a non-ammonia nitrogen source (i.e. urea) or volatization (i.e. diammonium phosphate), there may be a conversion thereof to ammonia.

Ammonia interacts advantageously with peat humic acids which is present in the decomposed peat material to produce ammonium humates. The ammonium humates are water soluble. The slow conversion of an ammonia carrier (e.g. urea) to ammonia coupled with the formation of ammonium humates provides an advantageous mechanism for the slow release of nitrogen; the slow release of nitrogen is of utmost importance for environmental protection and efficient use of the nitrogen as fertilizer.

Accordingly, it is advantageous to use a peat material having a relatively high humic acid content, e.g. a peat material which is relatively highly decomposed. The peat material may, for example, have a pH of less than 6.0 e.g. a pH of from 1.5 to 6.0, in particular a pH of from 2.0 to 6.0 (e.g. a pH of 3.0 to 5.0 a pH of 2.0 to 2.5, a pH of 2.0 to 5.0, a pH of 3.0 to 6.0, a pH of 2.0 to less than 3.0, etc.) after equilibration in a solution of KCl 1N (see Karam, A 1993. Chemical properties of organic soils. Pg 459–471, Chapter 44 in: Martin R Carter (ed.) Soil Sampling and methods of analysis, Canadian Soil science Society methods manual. Lewis Publishers Inc., Ann Arbor Mich.). The peat material may have a humification value of H4 or more (e.g. H5 to H7, H9, etc.) on the Von Post humification scale (see Parent, L. E. and J. Caron 1993. Physical properties of organic solids. Pg 441–458, Chapter 43 in Martin R Cater (ed.) Soil Sampling and methods of analysis, Canadian Soil science Society methods manual. Lewis Publishers Inc., Ann Arbor Mich.). The humic acid content of a suitable peat material may, for example, vary from 24 to 37 percent by weight (e.g. 24 to 28 percent by weight). The peat material may in particular be a medium to well decomposed sphagnum or woody-herbaceous peat. Suitable peat material may for example be found in Quebec, Canada, in New Brunswick, Canada, in Michigan, U.S.A., and in Minnesota, U.S.A. Suitable peat material may, for example, be obtained from Fafard Peat Moss Ltd., Pallot Road, Inkerman, New Brunswick, Canada; a peat material of about pH 2.28 may for example be obtained from Fafard Peat Moss Ltd.

In the figures.

Prior to association with the source of nitrogen, the peat may have to be broken down. This may be done in any suitable or known manner. The peat may be broken down to a size which is for example suitable for the manufacture of granules; see for example the mixer in FIG. 1 of publicly available Canadian patent application no 2,076,598. Advantageously the peat may be ground, e.g. it may be ground to a particle size of 3 mm or smaller, e.g. to a particle size in the range of 6 to 100 mesh (per Tyler Scale). Any suitable or desired means may be used for the grinding of the peat.

Figure 1:
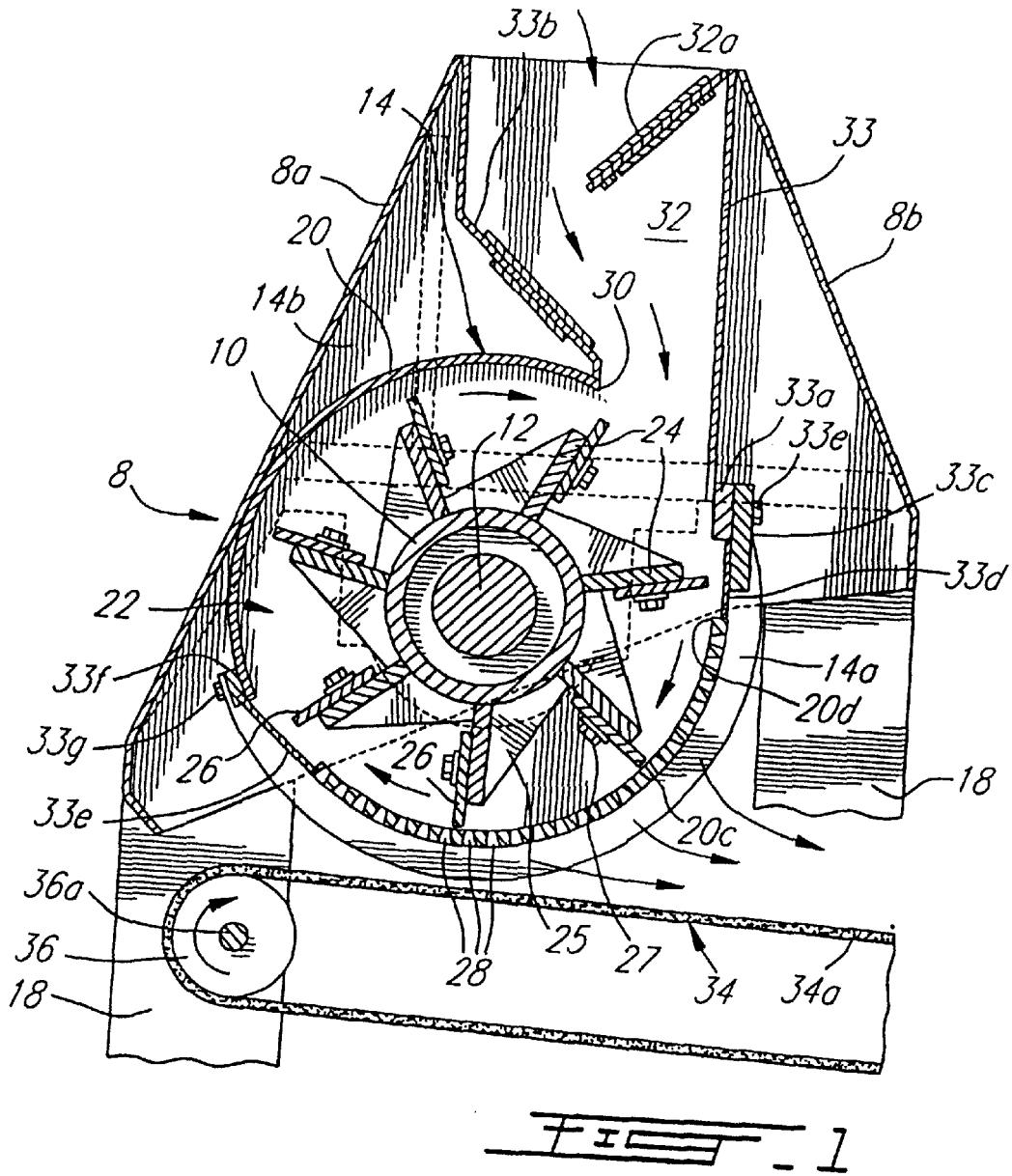
FIG. 1 is a cross sectional view of an example grinder for grinding peat material.
Figure 2:
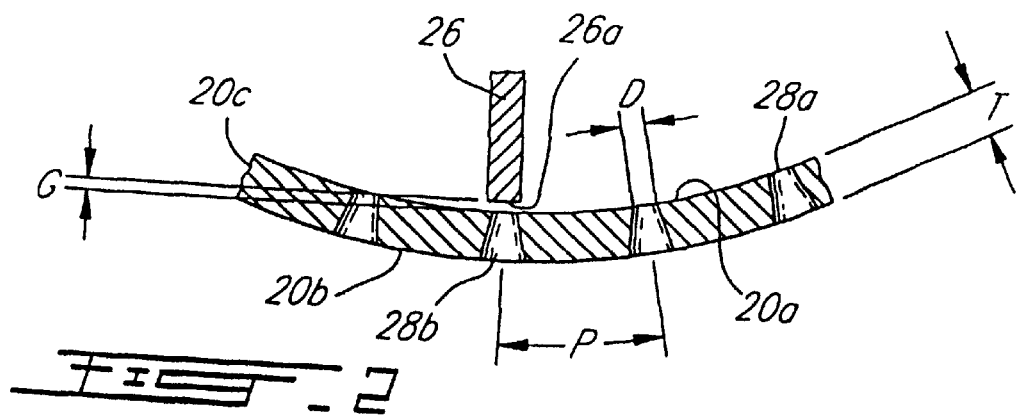
FIG. 2 is an enlarged cross-sectional view of the screen and blade tip of the grinder of FIG. 1.

An example of a suitable grinder is illustrated in FIGS. 1 and 2. The grinder comprises a housing 8 consisting of a downwardly, rearwardly inclined, rear wall 8a and a downwardly forwardly inclined front wall 8b joined by flat side walls 14b. A generally cylindrical casing 14 is formed within the housing 8,; a rotor is mounted within casing 14 and includes a hub 10 carried by a drive axle 12 which is journalled within the side walls 14b and extends coaxially of casing 14. A suitable drive means (not shown) rotates axle 12 in clockwise direction.

Housing 8 is supported by ground engaging legs 18.

Casing 14 includes a partly cylindrical imperforate wall 20 and a partly cylindrical screen 20c. Casing 14 defines a cylindrical chamber 22 coaxial with the horizontally disposed axis of drive axle 12.

The rotor further includes a plurality, preferably an odd number, of radial arms 24 secured to hub 10 and each reinforced by a trailing web 25. A radial flat rigid blade 26 is secured by a bolt 27 to the radial each arm 24. Each blade 26 is of generally rectangular shape and is provided with a slot through which bolt 27 extends, whereby the radial position of each blade can be adjusted. Each blade has a flat outer edge face 26a which is straight and which is parallel to the generatrix of screen 20c and imperforate wall 20. The radial position of the blades 26 is selected so as to define a gap G, between the edge face 26a and the inner surface 20a of screen 20c.

Screen 20c has a plurality of holes 28 preferably of frusto-conical shape, the smaller end 28a of each hole being located at the inner surface 20a of screen 20c and consequently, the larger end 28b of each hole being located at the screen outer surface 20b. The holes 28 are preferably disposed in transverse rows of pitch P between the rows.

As shown in FIG. 2, the minimum diameter of holes 28 is indicated at D and the screen thickness at T.

Casing 14 has the top inlet port indicated at 30, which forms the lower end of a funnel 32. Funnel 32 is defined by the housing side walls 14b, a front flat vertical wall 33 and a back inclined wall 33b merging at 30 with the top end of partly cylindrical imperforate casing wall 20.

The lower end of front wall 33 is secured to a transverse bar 33a extending between and joining the side walls 14b. The screen 20c can be easily removed and replaced by another screen to suit the type of fibrous material being ground. Different screens may be provided with a different thickness T, with a different pitch P and/or with a different hole diameter D.

The screen 20c is secured at its ends to the partially cylindrical shoulder strips 14a which are designed to flatly engage the side walls 14b. The two arcuate shoulder strips 14a are interconnected at their ends by a front transverse bar 33c and a back transverse bar 33f. Bar 33c is removably secured to front bar 33a by bolt 33e while rear bar 33f is removably secured to the bottom edge of arcuate casing wall 20 by bolts 33g.

Both ends of the screen 20c are extended by front extension sheet 33d and by back extension sheet 33e respectively which are secured to the front bar 33c and to the rear bar 33f respectively.

The inner surface of casing wall 20 is at a greater distance from the axis of casing 14 than the inner surface 20a of screen 20c. It follows that the gap between the flat edge faces 26a of blades 26 and the inner surface casing wall 20 is greater than gap G of the blades with screen 20c relative to the direction of rotation of rotor 10, 24, 26. The screen 20c defines a transverse leading edge 20d.

The grinder operates as follows: fibrous material is fed to the funnel 32, dropping on baffle 32a and then inclined back wall 33b to enter casing 14 through top inlet 30. The fibrous material is engaged by the rotating blades 26 and is immediately subjected to a shearing action by edge face 36a of a blade 26 approaching the leading edge 20d of screen 20c. The shearing action is continued between the blade edges 26a and the screen 20c whereby the fibres contained in the fibrous material are separated from the remainder of the material and aligned, completion of this separation sometimes requiring several rotations of the rotor. Upon leaving the trailing edge of the screen, the shearing action on the fibrous material immediately decreases since the gap G immediately increases. This allows easier return and recycling of fibrous material which, together with fresh material being fed through funnel 32, is again subjected to a shearing action between the blades and the screen.

Finally, the ground material is sufficiently disintegrated so as to easily pass through the screen holes under the centrifugal force exerted thereon by the rotating blades.

The composition of the present invention may be made and treated in accordance with a process comprising a mixing stage, an extrusion stage and a drying stage.

The mixing stage produces a precursor mixture in accordance with the present invention. The two ingredients are mixed together for a time sufficient to more or less uniformly distribute the components throughout the mixture. At this point if necessary a binding agent and water may be added followed by further mixing (e.g. for 7 to 10 minutes).

The precursor composition or mixture may then be subjected to an extrusion stage to obtain a composition in accordance with the present invention which is in the form of a spaghetti or noodle or macaroni like shaped extrudate. The extrudate may for example have a diameter of 0.4 to 0.8 cm and a length of from 0.6 to 2.5 cm; these dimensions may of course be varied as desired or necessary.

The extrudate may then be dried and subjected, as desired or necessary to a size reduction stage to obtain a composition in accordance with the present invention in the form of granules of desired size or size range. The product granules may have a waster content of less than 10 percent e.g. a water content in the range of from about 5 to 10 percent (dry weight basis).

In accordance with the present invention it is possible to obtain for example a peat fertilizer composition having from 20 to 40% (e.g. 30%) by weight peat material. It is possible for example to obtain a peat fertilizer component wherein relative to the N, P, and K content thereof (e.g. x % N, y % P ($P_2O_5$) and z % K by weight) the fertilizer is a 12-32-0 fertilizer, a 32-0-0 fertilizer, etc. (See the examples below);

a 12-32-0 fertilizer comprises 12% by weight N and 32% by weigh $P_2O_5$; a 32-0-0 fertilizer comprises 32% by weight N; etc..

In accordance with a further aspect the present invention provides in a process for applying a fertilizer to a soil, the improvement wherein the fertilizer comprises a composition of matter comprising peat material and an added source of nitrogen, said added source of nitrogen consisting of one of urea, diammonium phosphate, monoammonium phosphate and ammonia.

The following starting materials were used for the examples below:

a) The peat material was a sphagnum peat from the Inkerman region of New Brunswick. The peat has a high humification level (i.e. a humification level of H6 or H7 on the Von Post scale). The peat was previously ground by subjecting the raw peat to a grinding mechanism such as described herein so as to have a small particle size, i.e. the fibres are 3 mm or smaller in size (this particle size may be obtained in any other suitable or desired manner). The peat has a water content of about 30% by weight.

b) The added nitrogen source, which may be diammonium phosphate or urea, is in the form of particles of a particle size of from 50 to 150 mesh (on the Tyler scale).

c) The pre extrusion composition or mixture may if desired or as necessary include a binding agent such as for example sodium silicate in the form of a viscous aqueous liquid (viscosity—180 centipoise, 0.9% Na2O, 28.7%, SiO2, a specific gravity of 1.394)).

For the following examples granules are produced by a process comprising a mixing stage, an extrusion stage and a drying stage.

The mixing stage produces a precursor mixture in accordance with the present invention. The peat and nitrogen source are fed to a Paddle mixer (i.e. a mixer comprising a U-shaped trough in which is disposed a rotatable shaft from which a plurality of spaced projections extend radially therefrom and having a helical web for brushing the inner wall of the trough). The two ingredients are mixed together for a time sufficient to more or less uniformly distribute the components throughout the mixture; this may, for example, take for example 7 to 10 minutes. At this point if necessary a binding agent and water are added followed by further mixing (e.g. for 7 to 10 minutes). Some ammonia may be given off at this stage.

The pre-extrusion composition or mixture having a temperature equal to the ambiante temperature is fed to a rotary or centrifugal extruder. The extruder is as described in publicly available Canadian patent application no 2,076,598 (see for example FIG. 7 of this Canadian patent application). The temperature of the mixture is raised to about 45 to 55° C. During the extrusion the peat is ammoniated i.e. the peat adsorbs ammonia in an amount of about 5% of its weight (e.g. 120 kg of peat material may adsorb 6 kg of ammonia).

The pre-extrusion composition is feed continuously to the extruder at a rate of about 8 to 25 kg/min such that the residence time of the composition in the extruder is less than about 30 seconds. The extruder is provided with a housing having a curved side wall a portion of which is in the form of a curved screen of about ⅛ of an inch in thickness and provided with a plurality of ¼ inch openings. The extruder is provided with a rotor disposed in the housing. The rotor is provide with a plurality of imperforate radially extending blades which project therefrom so as to be able to brush the surface of the curved screen. The rotor may for example turn at about 120 revolutions per min. The blades are able to move the mixture through a circular path such that the mixture is compacted up against the screen and is extruded through the openings thereof so as to form an extrudate having a spaghetti or macaroni like form (i.e. a plurality of short elongated pieces).

In order to minimize bacterial problems as well as undesired chemical reactions (e.g. undesired are hydrolysis) the water content of the extrudate is reduced by air drying. The extrudate string or macaroni pieces urea dried by passing the granules through an air dryer such as described for example in the above mentioned Canadian patent application. During drying the temperature of the drying air is generally maintained at 85° C. or less, in order to limit nitrogen loss i.e. loss of ammonia. However, the air contacting the granules may initially, in a first stage, have a temperature of from about 85 to 110° C. due to the high initial water content of the granules water but the air temperature must be reduced in a second stage to 85° C. or less as the granules progressively loose water. The drying may for example be carried out with an air temperature of about 85° C. The granules are dried to a water content of less than 10% by weight e.g. to about 7 to 10% by weight.

The dried extrudate is allowed to cool and is then subjected to a size reduction stage (e.g. crushing) to obtain granules of desired size or size rande (e.g. (2 to 3 mm), e.g. by an suitable means of such as for example a vertically disposed plurality of opposed crushing rollers, each pair of lower rollers being spaced closer together than the pair disposed immediately thereabove; any suitable mechanism may be used to reduce to size of the extrudate. The product granules may have an apparent density of 700 to 1200 kg/m3.

EXAMPLE 1

Preparation of a Peat Fertilizer (12-32-0)

a) MIXING

An initial pre-extrusion composition is prepared by preparing a first mixture comprising 70% by dry weight of diammonium phosphate and 30% by dry weight of peat; e.g. 280 kg of diammonium phosphate and 171.4 kg of peat are mixed together for about 7 minutes or so, the peat comprising 30% by weight of water. About 40 kg of sodium silicate binder and 91.4 liters of water are admixed with the first mixture, mixing continuing for a further 7 minutes or so. The water is added so as to adjust the water content to 25% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded has a water content of about 25% by weight and a length of from 0.6 to 2.5 cm. In order to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 2

Preparation of a Peat Fertilizer (32-0-0)

a) MIXING:

An initial pre-extrusion composition is prepared by preparing a first mixture comprising 70% by dry weight of diammonium phosphate and 30% by dry weight of peat; e.g. 280 kg of urea and 171.4 kg of peat are mixed together for about 7 minutes or so, the peat comprising 30% by weight of water. About 81.9 liters of water are admixed with the first mixture, mixing continuing for a further 7 minutes or so. The water is added so as to adjust the water content to 25% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded granules have a water content of about 25% by weight and a length of from 0.6 to 2.5 cm. In order to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 3

Preparation of a Peat Fertilizer (14-36-0)

An initial pre-extrusion composition is prepared by preparing a first mixture comprising 80% by dry weight of diammonium and 20% by dry weight of peat; e.g. 320 kg of diammonium and 114.3 kg of peat are mixed together for about 7 minutes or so, the peat comprising 30% by weight of water. About 40 kg of the sodium silicate binder and 25.7 liter of water are admixed with the first mixture, mixing continuing for a further 7 minutes or so. The water is added so as to adjust the water content to 20% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded granules have a water content of about 20% by weight and a length of from 0.6 to 2.5 cm and a length of from 0.6 to 2.5 cm. In over to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 4

Preparation of a Peat Fertilizer (36-0-0)

MIXING:

An initial pre-extrusion composition is prepared by preparing a first mixture comprising 80% by dry weight of and 20% by dry weight of peat; e.g. 320 kg of urea and 114.3 kg of peat are mixed together for about 7 minutes or so, the peat comprising 30% by weight of water. About 65.7 liters of water are admixed with the first mixture, mixing continuing for a further 7 minutes or so. The water is added so as to adjust the water content to 20% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded granules have a water content of about 20% by weight and a length of from 0.6 to 2.5 cm. In order to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 5

Preparation of a Peat Fertilizer (7-36-0)

a) MIXING:

An initial pre-extrusion composition is prepared by preparing a first mixture comprising 70% by dry weight of monoammonium phosphate and 30% by dry weight of peat; e.g. 280 kg of monoammonium phosphate and 171.4 kg of peat are mixed together for about 7 minutes or so, the peat comprising 30% by weight of water. About 40 kg of sodium silicate binder and 91.4 liters of water are admixed with the first mixture, mixing continuing for a further 7 minutes or so. The water is added so as to adjust the water content to 25% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded has a water content of about 25% by weight and a length of from 0.6 to 2.5 cm. In order to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 6

Preparation of a Peat Fertilizer (8-41-0)

An initial pre-extrusion composition is prepared by preparing a first mixture comprising 80% by dry weight of monoammonium and 20% by dry weight of peat; e.g. 320 kg of monoammonium and 114.3 kg of peat are mixed together for about 7 minutes or so, the peat comprising 30% by weight of water. About 40 kg of the sodium silicate binder and 25.7 liter of water are admixed with the first mixture, mixing continuing for a further 7 minutes or so. The water is added so as to adjust the water content to 20% which has been found to be most suitable for the subsequent extrusion of this pre-extrusion composition.

b) EXTRUSION:

The pre-extrusion composition is extruded as discussed above so as to obtain an extruded.

c) DRYING:

The obtained extruded granules have a water content of about 20% by weight and a length of from 0.6 to 2.5 cm and a length of from 0.6 to 2.5 cm. In order to minimize bacterial problems the water content of the granules is reduced by air drying to about 7 to 10% by weight.

d) SIZE REDUCTION OF OVERSIZE PARTICLES:

The dried extruded is treated to obtain granules having a size of from 6 to 16 mesh, Tyler.

EXAMPLE 7

Use of a Peat Fertilizer for the Growing of Potatoes

A peat fertilizer component in accordance with example 1 (i.e. of a medium decomposed peat and diammonium phosphate (12-32-0)) was applied to the soil of a field at two different sites to grow potatoes.

A peat based fertilizer and a control fertilizer were applied to both sizes to supply 100% of crop requirements.

At site 1 the peat fertilizer component (12-32-0) was used in an amount of sufficient to provide the potato plants with 43% of their nitrogen and 100% of their phosphorous needs. A control field was treated with a known diammonium phosphate mineral fertilizer component (18-46-0) in an amount sufficient to provide the potato plants with 44% of their nitrogen and 100% of their phosphorous needs.

At site 2 the peat fertilizer component (12-32-0) was used in an amount sufficient to provide the potato plants with 41% of their nitrogen and 100% of their phosphorous needs. A control field was treated with a known diammonium phosphate mineral fertilizer component (18-46-0) in an amount sufficient to provide the potato plants with 42% of their nitrogen and 100% of their phosphorous needs.

In each case the remaining mineral fertilizer components were ammonia nitrate (27.5-0-0), sulfates of potassium and magnesium (0-0-22 | 11% Mg), potassium chloride (0-0-60) and sulfate (0-0-50) soluble calcium and micro nutrients boron (as borate), and CMM+ (a solid material comprising 20% zinc, 5% copper and 5% manganese (as oxysulfate) available from the Cooperative féderée du Québec, Queébec Canada).

Table 1 shows the fertilizers used at each site:

TABLE 1

| Formula or name | Site 1 | | Site 2 | |
| --- | --- | --- | --- | --- |
| | Peat-base fertilizer (kg) | Control fertilizer (kg) | Peat-base fertilizer (kg) | control fertilizer (kg) |
| 12-32-0 | 161.1 | — | 172.0 | — |
| 18-46-0 | — | 113.0 | — | 120.0 |
| 0-0-60 | 53.3 | 53.7 | 50.3 | 50.0 |
| 27.5-0-0 | 93.5 | 90.5 | 111.5 | 109.0 |
| 0-0-22 \| 11% mg | 78.0 | 78.0 | 112.4 | 113.0 |
| borate | 4.6 | 4.5 | 3.6 | 3.6 |
| CMM+ | 1.4 | 1.6 | 5.5 | 5.6 |
| 0-0-50 | 30.0 | 30.0 | — | — |
| soluble calcium | 40.0 | 41.0 | — | — |
| grit | 37.0 | 37.0 | 43.0 | 98.0 |
| total | 499.0 | 499.0 | 498.0 | 499.0 |

The following tables 1a, 1b, 2a and 2b demonstrate that the peat fertilizer of example 1 provides a higher production than the known mineral fertilizer.

TABLE 1a

Total production

| | Site 1 | | |
| --- | --- | --- | --- |
| | Production | | Specific |
| Fertilizer | Total tons/ha | Sales tons/ha | Weight |
| Example 1 | 29.16 | 28.70 | 1.074 |
| Known fertilizer | 25.61 | 25.36 | 1.069 |

TABLE 1b

Total production

| | Site 2 | | |
| --- | --- | --- | --- |
| | Production | | Specific |
| Fertilizer | Total tons/ha | Sales tons/ha | Weight |
| Example 1 | 35.15 | 34.59 | 1.080 |
| Known fertilizer | 34.58 | 33.98 | 1.084 |

TABLE 2a

Production by size

| | Site 1 | | | |
| --- | --- | --- | --- | --- |
| | Category | | | |
| Fertilizer | <3.75 cm | 3.75 to 6 cm | 6 to 9 cm | >9 cm |
| Example 1 | 0.49 tons/ha | 5.85 tons/ha | 20.65 tons/ha | 2.19 t/ha |
| Known fertilizer | 0.25 tons/ha | 5.45 tons/ha | 19.30 tons/ha | 0.60 t/ha |

TABLE 2b

Production by size

| | Site 2 | | | |
| --- | --- | --- | --- | --- |
| | Category | | | |
| Fertilizer | <3.75 cm | 3.75 to 6 cm | 6 to 9 cm | >9 cm |
| Example 1 | 0.57 tons/ha | 6.9 tons/ha | 27.14 tons/ha | 0.95 t/ha |
| Known fertilizer | 0.60 tons/ha | 6.43 tons/ha | 25.75 tons/ha | 1.60 t/ha |

EXAMPLE 8

Use of a Peat Fertilizer for the Growing of Potatoes

A peat fertilizer composition in accordance with example 1 (i.e. of a medium decomposed peat and diammonium phosphate (12-32-0) was applied to the soil of a field at two different sites to grow potatoes.

Fertilizers were applied to supply 80% of the required nitrogen for the peat based fertilizer treatment and 100% of required N for the control treatment. Other nutrients were supplied in both cases at 100% of crop requirements.

At site 1 the peat fertilizer component (12-32-0) was used in an amount sufficient to provide the potato plants with 60% of their nitrogen and 100% of their phosphorous needs. A control field was treated with a known diammonium phosphate mineral fertilizer component (18-46-0) in an amount sufficient to provide the potato plants with 45% of their nitrogen and 100% of their phosphorous needs.

At site 2 the peat fertilizer component (12-32-0) was used in an amount sufficient to provide the potato plants with 54% of their nitrogen and 100% of their phosphorous needs. A control field was treated with a known diammonium phosphate mineral fertilizer component (18-46-0) in an amount sufficient to provide the potato plants with 42% of their nitrogen and 100% of their phosphorous needs.

In each case the remaining mineral fertilizer components were ammonia nitrate (27.5-0-0), sulfates of potassium and magnesium (0-0-22+11% Mg), potassium chloride (0-0-60) and sulfate (0-0-50) soluble calcium and micro nutrients boron (as borate), and CMM+ (see above).

Table 3 shows the fertilizers used at each site:

TABLE 3

| Formula or name | Site 1 | | Site 2 | |
|---|---|---|---|---|
| | control fertilizer (kg) | Peat-base fertilizer (kg) | control fertilizer (kg) | peat-base fertilizer (kg) |
| 12-32-0 | — | 161.0 | — | 173.0 |
| 18-46-0 | 113.0 | — | 120.0 | 0.0 |
| 0-0-60 | 53.7 | 53.5 | 50.0 | 47.0 |
| 27.5-0-0 | 90.5 | 46.0 | 109.0 | 63.4 |
| 0-0-22 \| 11% mg | 78.0 | 80.5 | 113.0 | 121.5 |
| borate | 4.5 | 4.3 | 3.6 | 3.3 |
| CMMT | 1.6 | 1.5 | 5.6 | 5.6 |
| 0-0-50 | 30.0 | 28.7 | — | — |
| soluble calcium | 41.0 | 51.4 | — | — |
| grit | 87.0 | 72.0 | 98.0 | 85.0 |
| total | 499.0 | 499.00 | 498.0 | 500.0 |

The following tables demonstrate that the peat fertilizer of example 3a, 3b, 4a and 4b provides a higher production than the known mineral fertilizer.

TABLE 3a

Total production

Site 1

| Fertilizer | Production | | Specific Weight |
|---|---|---|---|
| | Total tons/ha | Sales tons/ha | |
| Example 1 | 30.85 | 30.47 | 1.073 |
| Known fertilizer | 25.61 | 25.36 | 1.069 |

TABLE 3b

Total production

Site 2

| Fertilize | Production | | Specific Weight |
|---|---|---|---|
| | Total tons/ha | Sales tons/ha | |
| Example 1 | 38.27 | 37.25 | 1.082 |
| Known fertilizer | 34.58 | 33.98 | 1.084 |

TABLE 4a

Production by size

Site 1

| Fertilizer | Category | | | |
|---|---|---|---|---|
| | <3.75 cm | 3.75 à 6 cm | 6 à 9 cm | >9 cm |
| Example 1 | 0.38 tons/ha | 6.89 tons/ha | 22.91 tons/ha | 0.67 t/ha |
| Known fertilizer | 0.25 tons/ha | 5.45 tons/ha | 19.30 tons/ha | 0.61 t/ha |

TABLE 4b

Production by size

Site 2

| Fertilizer | Category | | | |
|---|---|---|---|---|
| | <3.75 cm | 3.75 à 6 cm | 6 à 9 cm | >9 cm |
| Example 1 | 1.02 tons/ha | 9.94 tons/ha | 25.74 tons/ha | 1.57 t/ha |
| Known fertilizer | 0.60 tons/ha | 6.43 tons/ha | 25.75 tons/ha | 1.60 t/ha |

We claim:

1. In a process for making a peat based fertilizer comprising a mixing stage wherein a peat material is mixed with an added source of nitrogen so as to form a mixture thereof, the improvement wherein said peat material is a peat material having a pH of less than 6.0 after equilibration in a solution of KCl 1N, and a humification value of H4 or more on the Von Post humification scale, and said added source of nitrogen is selected from the group consisting of urea, diammonium phosphate, monoammonium phosphate and ammonia.

2. A process as defined in claim 1 wherein said peat material is a peat material having a pH of 1.5 to 6.0 after equilibration in a solution of KCl 1N.

3. A process as defined in claim 2 wherein said peat material is a peat material having a pH of 2.0 to 5.0 after equilibration in a solution of KCl 1N, and a humification value of H5 to H7 on the Von Post humification scale.

4. A process as defined in claim 2 wherein said added source of nitrogen consists of urea.

5. A process as defined in claim 4 wherein said peat material having a pH of 2.0 to 5.0 after equilibration in a solution of KCl 1N, and a humification value of H5 to H7 on the Von Post humification scale.

6. A process as defined in claim 2 wherein said added source of nitrogen consists of diammonium phosphate.

7. A process as defined in claim 6 wherein said peat material is a peat material having a pH of 2.0 to 5.0 after equilibration in a solution of KCl 1N, and a humification value of H5 to H7 on the Von Post humification scale.

8. A process as defined in claim 1 wherein said peat material is a peat material having a pH of 1.5 to less than 3.0 after equilibration in a solution of KCl 1N.

9. A process as defined in claim 8 wherein said peat material is a peat material having a pH of 2.0 to less than 3.0 after equilibration in a solution of KCl 1N, and a humification value of H5 to H7 on the Von Post humification scale.

10. A process as defined in claim 8 wherein said added source of nitrogen consists of diammonium phosphate.

11. A process as defined in claim 10 wherein said peat material is a peat material having a pH of 2.0 to less than 3.0 after equilibration in a solution of KCl 1N, and a humification value of H5 to H7 on the Von Post humification scale.

12. A process as defined in claim 8 wherein said added source of nitrogen consists of urea.

13. A process as defined in claim 12 wherein said peat material is a peat material having a pH of 2.0 to less than 3.0 after equilibration in a solution of KCl 1N, and a humification value of H5 to H7 on the Von Post humification scale.

14. A composition of matter comprising a peat material and an added source of nitrogen, wherein said peat material is a peat material having a pH of less than 6.0 after equilibration in a solution of KCL 1N, and a humification value of H4 or more on the Von Post humification scale, and said added source of nitrogen is selected from the group consisting of urea, diammonium phosphate, monoammonium phosphate and ammonia.

15. A composition of matter as defined in claim 14 wherein said peat material is a peat material having a pH of 1.5 to 6.0 after equilibration in a solution of KCL 1N.

16. A composition of matter as defined in claim 15 wherein said composition of matter is a pre-cursor mixture and wherein said peat material is a peat material having a pH of 2.0 to 5.0 after equilibration in a solution of KCl 1N, and a humification value of H5 to H7 on the Von Post humidification scale.

17. A composition of matter as defined in claim 15 wherein said composition of matter is a pre-cursor mixture.

18. A composition of matter as defined in claim 15 wherein said added source of nitrogen consists of urea.

19. A composition of matter as defined in claim 18 wherein said composition of matter is a pre-cursor mixture and wherein said peat material is a peat material having a pH of 2.0 to 5.0 after equilibration in a solution of KCl 1N, and a humification value of H5 to H7 on the Von Post humification scale.

20. A composition of matter as defined in claim 15 wherein said added source of nitrogen consists of diammonium phosphate.

21. A composition of matter as defined in claim 20 wherein said composition of matter is a pre-cursor mixture and wherein said peat material is a peat material having a pH of 2.0 to 5.0 after equilibration in a solution of KCl 1N, and a humification value of H5 to H7 on the Von Post humification scale.

22. A composition of matter as defined in claim 14 wherein said peat material is a peat material having a pH of 1.5 to less than 3.0 after equilibration in a solution of KCL 1N.

23. A composition of matter as defined in claim 22 wherein said composition of matter is a pre-cursor mixture and wherein said peat material is a peat material having a pH of 2.0 to less than 3.0 after equilibration in a solution of KCl 1N, and a humidification value of H5 to H7 on the Von Post humidification scale.

24. A composition of matter as defined in claim 22 wherein said composition of matter is a pre-cursor mixture.

25. A composition of matter as defined in claim 22 wherein said added source of nitrogen consists of urea.

26. A composition of matter as defined in claim 25 wherein said composition of matter is a pre-cursor mixture and wherein said peat material is a peat material having a pH of 2.0 to less than 3.0 after equilibration in a solution of KCl 1N, and a humification value of H5 to H7 on the Von Post humification scale.

27. A composition of matter as defined in claim 22 wherein said added source of nitrogen consists of diammonium phosphate.

28. A composition of matter as defined in claim 27 wherein said composition of matter is a pre-cursor mixture and wherein said peat material is a peat material having a pH of 2.0 to less than 3.0 after equilibration in a solution of KCl 1N, and a humification value of H5 to H7 on the Von Post humification scale.

* * * * *